United States Patent
Guttmann et al.

[15] 3,681,355
[45] Aug. 1, 1972

[54] ERGONARCARNINES

[72] Inventors: Stephen Guttmann, Allschwil; Rene Huhuenin, Reinach Basel-Land, both of Switzerland

[73] Assignee: Sandoz Ltd.(a/k/a Sandoz AG), Basel, Switzerland

[22] Filed: June 15, 1970

[21] Appl. No.: 46,480

[30] Foreign Application Priority Data

June 20, 1969 Switzerland ................9462/69

[52] U.S. Cl. .............................260/268 PE, 424/261
[51] Int. Cl. ..............................................C07d 43/20
[58] Field of Search ...............................260/268 PE

[56] References Cited

UNITED STATES PATENTS

| | | | |
|---|---|---|---|
| 3,586,683 | 6/1971 | Stadler | 260/268 PE |
| 3,113,133 | 12/1963 | Hofmann et al. | 260/268 PE |
| 3,428,639 | 2/1909 | Stadler et al. | 260/268 PE |
| 2,997,470 | 8/1901 | Pioch | 260/268 PE |

FOREIGN PATENTS OR APPLICATIONS 1,149,565   4/1969   Great Britain ..........260/268 PE

*Primary Examiner*—Donald G. Daus
*Attorney*—Gerald D. Sharkin, Robert S. Honor, Frederick H. Weinfeldt, Richard E. Vila and Walter F. Jewell

[57] ABSTRACT

The invention concerns novel compounds of the formula:

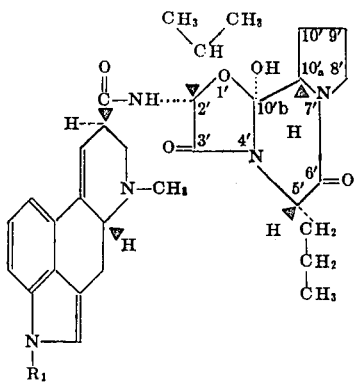

wherein $R_1$ is hydrogen or methyl.

The one compound, ergonorcornine, is useful in inhibiting lactation, and the other compound, 1-methyl-ergonorcornine, is useful in stimulating lactation.

Processes for the production of the said compounds are also disclosed.

2 Claims, No Drawings

ERGONARCARNINES

IMPROVEMENTS IN OR RELATING TO ORGANIC COMPOUNDS

The present invention relates to new heterocyclic compounds of formula I,

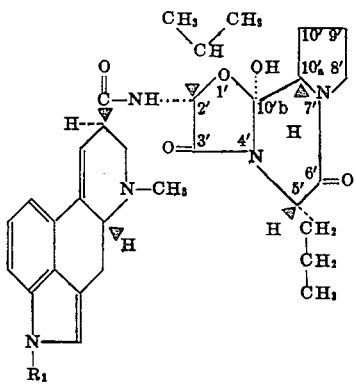

wherein $R_1$ is hydrogen or methyl.

Processes for the production of these compounds and their salts with acids, as well as pharmaceutical preparations of the compounds of formula I and their acid addition salts are also described.

In accordance with the invention a. a compound of formula I or an acid addition salt thereof is obtained by condensing a salt of the compound of formula II

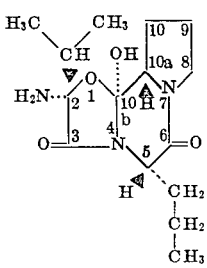

in an inert solvent and in the presence of a basic condensation agent, with a reactive, functional derivative of an acid of formula III,

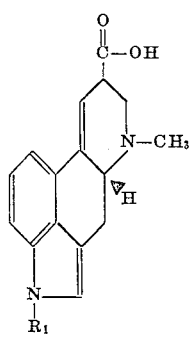

wherein $R_1$ is as defined above,
and where required converting the resulting compound of formula I into an acid addition salt, or b. the compound of formula Ia

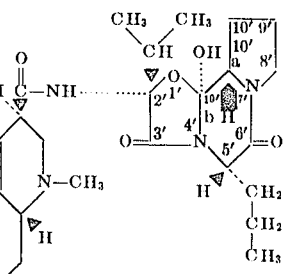

is obtained by methylating the compound of formula Ib

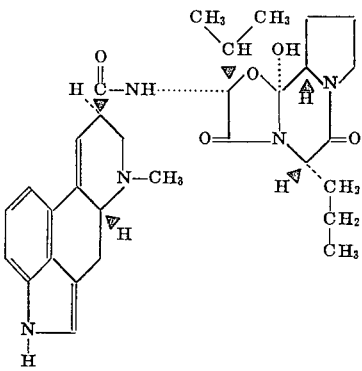

in an inert solvent and in the presence of a strong base, and where required converting the resulting compound of formula Ia into an acid addition salt.

Reactive, functional derivatives of acids of formula III, which may be used for the condensation of the invention in accordance with section (a), are their mixed anhydrides with trifluoroacetic acid or with sulphuric acid, their acid chloride hydrochlorides or their azides. It is likewise possible to use the addition product of an imidohalide of an N-di(lower)alkyl-substituted carboxylic acid amide, e.g., dimethyl formamide or dimethyl acetamide.

The compound of formula II is employed in the form of a salt, preferably the hydrochloride, but other mineral acid salts may likewise be used.

One preferred method of effecting the process of the invention consists in that compounds of formula III are reacted at $-20°$ to $-10°$ C with trifluoroacetic acid anhydride in an inert solvent and in the presence of trifluoroacetic acid, and the resulting mixed anhydrides of trifluoroacetic acid and a compound of formula III are reacted at $-20°$ to $-10°$ C with a salt of the compound of formula II in an inert organic solvent and in the presence of a tertiary organic base, e.g., pyridine or homologues thereof, and the reaction mixture is allowed to react for a short time at a temperature of about $-10°$ to $0°$ C.

A preferred embodiment of the process of the invention consists in that the compounds of formula III are employed as a mixture. For example, the mixture may contain aside from lysergic acid or 1-methyl-lysergic acid, isolysergic acid or 1-methyl-isolysergic acid and 6-methyl-$\Delta^{8,9}$-ergolene-8-carboxylic acid or 1-methyl-6-methyl-$\Delta^{8,9}$-ergolene-8-carboxylic acid. A mixture of lysergic acid, isolysergic acid and 6-methyl-$\Delta^{8,9}$-ergolene-8-carboxylic acid may be obtained directly by saprophytic cultivation of the fungus strain NRRL 3080 of the species Claviceps paspali Stevens et Hall. This mixture may be dried by heating to 150° C in a vacuum and is preferably employed in dry form.

For the production of the mixed anhydrides of compounds of formula III with trifluoroacetic acid the ratio of the starting materials is chosen such that 1 to 1.4 mols of trifluoroacetic acid anhydride and 2 mols of trifluoroacetic acid are used for every mol of the dry mixture of compounds of formula III. Examples of inert solvents which may be used are acetonitrile, dimethyl formamide, dimethyl acetamide, propionitrile, N-methyl-pyrrolidone, methylene chloride, or mixtures thereof.

The sequence of the addition of the reagents for the production of the mixed anhydrides is exchangeable. Thus, for example, the dry mixture of compounds of formula III may be suspended in one of the organic solvents mentioned above and may be dissolved in 1 to 5 mols, preferably about 2 mols of trifluoroacetic acid, and 1.2 mols of trifluoroacetic acid anhydride may then be added, or both reagents may be simultaneously added dropwise to a suspension of the compounds of formula III in the inert solvent. It is furthermore possible to exchange the sequence of the addition of trifluoroacetic acid and trifluoroacetic acid anhydride.

Since the resulting mixed anhydrides of compounds of formula III with trifluoroacetic acid decompose easily, they are preferably used immediately in solution for the next reaction. The compound of formula II in the form of a salt, e.g., the hydrochloride, is then immediately added to this solution. The base of formula II is liberated by the addition of a large excess of a tertiary organic base at −20° to −10° C; this base reacts spontaneously with the mixture of compounds of formula III. If desired, the sequence of the addition of the base and the salt of the compound of formula II may be exchanged.

In accordance with a further embodiment, the mixed anhydrides of acids of formula III with sulphuric acid are used and the condensation is effected in an inert solvent, e.g., dimethyl formamide, in the presence of a tertiary organic base, at −10° to 0° C, with a salt of the compound of formula II.

In accordance with yet a further embodiment, the acid chloride hydrochlorides of acids of formula III are used, and the condensation is effected in an inert solvent, in the presence of a tertiary organic or weak inorganic base, at −10° to 0° C, with a salt of the compound of formula II.

In accordance with another embodiment, the azides of acids of formula III are used and the condensation is effected in the presence of a tertiary organic base, at a temperature of about 0° C to room temperature, in an inert solvent, with a salt of the compound of formula II.

In accordance with yet another embodiment, a salt of the compound of formula II is reacted with a compound of formula III, in an inert solvent and in the presence of an N-di(lower)alkyl-substituted acid amide of an aliphatic monocarboxylic acid and a chlorinating and brominating agent, as well as an acid-binding agent.

The compound of formula I$a$ may likewise be obtained in accordance with the invention by methylating the compound of formula I$b$ in the presence of a basic condensation agent, e.g., an alkali metal alcoholate or alkali metal amide, and optionally converting the resulting methylation product into an acid addition salt.

One preferred method of effecting the methylation process of the invention consists in adding metallic sodium or potassium portionwise to a solution of a lower aliphatic alcohol, e.g., ethanol, in liquid ammonia, and waiting until discoloration of the solution occurs. The compound of formula I$b$ is added at about −40° C while stirring well to the resulting solution of the alkali metal alcoholate, and after its dissolution methyl iodide is added, the ammonia is removed by evaporation in a vacuum and the residue is divided between an aqueous alkali metal carbonate solution and methylene chloride, the organic phase is washed with water, dried over sodium sulphate, and the methylene chloride is removed. For this reaction it is preferred to use about 5 mols of an alkali metal alcoholate and approximately the same excess of methyl iodide for every mol of the compound of formula I$b$.

The compounds of formula I are useful because they possess pharmacological activity in animals. More particularly, the compound ergonorcornine is useful in inhibiting lactation as indicated by an inhibition of pseudocyesis in rats and an inhibition of lactation in rabbits. The compound 1methyl-ergonorcornine on the other hand is useful in stimulating lactation as indicated by an inducement of pseudocyesis in rats.

For the above-mentioned uses, the dosages administered will of course vary depending on the mode of administration and the extend of the effect desired. However, in general, satisfactory results are obtained for each of the effects(one effect with the one compound and the other with the other compound) at daily dosages between 0.1 and 3 mg/kg test animal body weight, conveniently given in divided doses 2 to 3 times a day or in sustained release form. For larger mammals, total daily dosages (for each of the effects) range from about 1 mg to about 15 mg of active compound, and unit dosage forms suitable for oral administration contain between 0.3 and 15 mg of the particular compound in association with a pharmaceutically acceptable carrier or diluent.

The new compounds may be used as medicaments on their own or in the form of appropriate medicinal preparations for oral, enteral or parenteral administration.

The compounds of formula I are named with trivial names in a manner analogous to the names of other, already known ergot alkaloids, or their names are derived from the basic structure of formula IV.

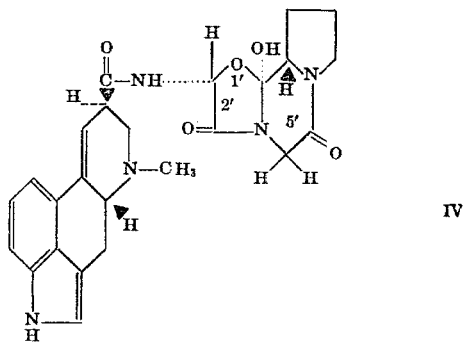

IV

The compound of formula IV is named ergopeptine.

The prefix "1-methyl" is placed before the name in the case of the compounds of formula I, wherein $R_1$ is methyl.

In the following examples, which illustrate the process without in any way limiting the scope of the invention, all temperatures are indicated in degrees Centigrade and are uncorrected.

EXAMPLE 1

Ergonorcorhine (2'β-isopropyl-5'α-n-propyl-ergopeptine)

2.68 g (10 millimols) of an anhydrous mixture of 40 percent of d-lysergic acid, 40 percent of 6-methyl-$\Delta^{8,9}$-ergolene-8-carboxylic acid and 20 percent of isolysergic acid are dissolved in 25 cc of absolute dimethyl formamide by the addition of 2.28 g (20 millimols) of trifluoroacetic acid, and the mixture is brought to a temperature of −10° while stirring. A mixture of 2.52 g (12 millimols) of trifluoroacetic acid anhydride in 12 cc of absolute acetonitrile is added dropwise at this temperature within 5 minutes, and the solution is stirred for a further 10 minutes. 1.73 g (5 millimols) of (2R,5S,b10aS,10bS)-2-amino-3,6-dioxo-10b-hydroxy-2-isopropyl-5-(propyl-1)-octahydro-8H-oxazolo[3,2-a]pyrrolo[2,1-c]pyrazine hydrochloride and 12 cc of pyridine are subsequently added with strong cooling, and the reaction mixture is stirred at a temperature between −10 ° and 0° for a further hour. Working up is effected by diluting with 200 cc methylene chloride and shaking thoroughly with 100 cc of a 2 N sodium carbonate solution. The aqueous phase is again extracted thrice with 100 cc amounts of methylene chloride. The combined organic phases are dried over sodium sulphate and concentrated by evaporation in a vacuum. The residue is chromatographed on silica gel with ethyl acetate. Ergonorcornine, having a M.P. of 175°–177°, $[\alpha]_D^{20} = -75°$ ($c$ = 1.5 in pyridine), is obtained after recrystallization with ethyl acetate.

EXAMPLE 2

ERGONORCORNINE (2'β-isopropyl-5'α-n-propyl-ergopeptine 37.2 g (115 millimols) of d-lysergic acid chloride hydrochloride and 20.8 g (60 millimols) of (2R,5S,10aS,10bS)-2-amino-3,6-dioxo-10b-hydroxy-2-isopropyl-5-(propy-1)-octahydro-8H-oxazolo[3,2-a]pyrrolo[2,1-c]pyrazine hydrochloride are suspended in 300 cc of dimethyl formamide, and stirring is effected at −10°. 11.5 cc of anhydrous pyridine are added dropwise within 15 minutes, whereby the suspension gradually dissolves. Stirring is continued at 25° for 90 minutes. After the addition of 60 cc of a 4 N sodium carbonate solution, the solution is evaporated to dryness at 30° and reduced pressure, the residue is dissolved in a mixture of 1,000 cc of methylene chloride/methanol (8:2) and 200 cc of a 4 N sodium carbonate solution, and the phases are separated. The organic phase is washed thrice with 200 cc amounts of a 4 N sodium carbonate solution, the combined aqueous phases are extracted 4 times with 500 cc amounts of methylene chloride/methanol (8:2), the combined organic phases are dried over sodium sulphate and animal charcoal and are evaporated to dryness. The residue is chromatographed on silica gel with ethyl acetate. Ergonorcornine, having a M.P. of 175°–177°, $[\alpha]_D^{20} = -75°$ ($c$ = 1.5 in pyridine), is obtained after recrystallization with ethyl acetate.

EXAMPLE 3

1-Methyl-ergonorcornine(1-methyl-2'β-isopropyl-5'α-n-propyl-ergopeptine)

A solution of 2 cc of absolute ethanol in 2.5 cc of absolute ether is added dropwise within 20 minutes while stirring to a solution of 0.49 g of sodium metal in 100 cc of liquid ammonia, whereby the initially dark blue solution is decolorized. 1.31 g of dry ergonorcornine are subsequently added, stirring is effected for 5 minutes until the material dissolves completely, and 1.65 g of methyl iodide in 2 cc of absolute ether are added dropwise at −40° within 5 minutes. After stirring for half an hour at the same temperature the clear solution is carefully heated and the ammonia is drawn off by suction in a partial vacuum. The remaining yellow residue is dissolved in a mixture of 50 cc of methylene chloride and 50 cc of a concentrated aqueous sodium bicarbonate solution. The organic phase is washed with an aqueous sodium bicarbonate solution and then with a 30 percent common salt solution. After drying the combined organic phases and removing the solvent by distillation at 50° the residue is taken up and crystallized in ethyl acetate, whereby an already thin layer chromatographically pure 1-methyl-ergonorcornine, having a decomposition point of 223°, is obtained. $[\alpha]_D^{20} = -88°$ ($c$ = 1.1 in pyridine).

The (2R,5S,10aS,10bS)-2-amino-3,6-dioxo-10b-hydroxy-2-isopropyl-5-(propyl-1)-octahydro-8H-oxazolo[3,2-a]pyrrolo[2,1-c]-pyrazine hydrochloride, used as starting material, is produced as follows:

a. (3S,8aS)-1,4-dioxo-3-(propyl-1)-octahydro-pyrrolo[1,2-a]pyrazine.

24.9 g (0.1 mol) of N-carbobenzoxy-L-proline and 13.3 g (0.1 mol) of freshly distilled L-norvaline methyl ester are dissolved in 100 cc of ethyl acetate, and 22.6 g (0.11 mols) of dicyclohexyl carbodiimide in 25 cc of ethyl acetate are added dropwise at 5°–10° while stirring. The reaction mixture is stirred at 40° for 1 hour, the precipitating dicyclohexyl urea is filtered off and the filtrate is washed first with N hydrochloric acid and then with N ammonium hydroxide. After concentrating the ethyl acetate solution, petroleum ether is added and the N-carbobenzoxy-L-prolyl-L-norvaline methyl ester which crystallizes is filtered off. M.P. 98°, $[\alpha]_D^{22} = +8°$ in acetic acid.

36.2 g (0.1 mol) of N-carbobenzoxy-L-prolyl-L-norvaline methyl ester are dissolved in 400 cc of methanol, and hydrogenation is effected with 2 g of palladium (10 percent) on active charcoal at room temperature and normal pressure. After removing the catalyst by filtration the solvent is removed in a vacuum and the oily residue is dissolved in 200 cc of m-xylene. 40 mg of benzoic acid are added to the solution, approximately 20 cc of the solvent are removed by distillation and the reaction mixture is subsequently boiled at reflux for 5 hours. After cooling the solution is allowed to crystallize. After standing at about 0° for several days crystalline (3S,8aS)-1,4-dioxo-3-(propyl)-1)-octahydro-pyrrolo[1,2-a]pyrazine is obtained. M.P. 134°, $[\alpha]_D^{20} = -135° (\pm 2°)$, $c$ = 1 in ethanol.

b. (2R,5S,10aS,10bS)-2-carboxy-3,6-dioxo-10b-hydroxy-2-isopropyl-5-(propyl-1)-octahydro-8H-oxazolo[3,2-a]pyrrolo[2,1-c]pyrazine.

78.4 g (400 millimols) of (3S,8aS)-1,4-dioxo-3-(propyl-1)-octahydro-pyrrolo[1,2-a]pyrazine are dissolved in 200 cc of dioxane, 144 g of N-ethyl diisopropylamine and 120 g (400 millimols) of 2-benzyloxy-2-isopropyl-malonic acid chloride monoethyl ester are added, and the mixture is heated to 70° while stirring for 3 hours. The resulting thick mass is dissolved in 600 cc of glacial acetic acid and hydrogenation is effected in the presence of 25 g of 10 percent palladium on charcoal at 50° and normal pressure. After the taking up of hydrogen is complete a further 5 g of catalyst are added and hydrogenation is continued. The catalyst is removed by filtration, the filtrate is dried at 30° and the residue is dissolved in ethyl acetate. The solution is washed with N hydrochloric acid and subsequently with N sodium bicarbonate solution and the organic solution is evaporated to dryness. The resulting (2R,5S,10aS,10bS)-2-ethoxycarbonyl-3,6-dioxo-10b-hydroxy-2-isopropyl-5-(propyl-1)-octahydro-8H-oxazolo[3,2-a]-pyrrolo[2,1-c]pyrazine is dissolved in a mixture of 100 cc of dioxane and 550 cc of a 2 N caustic soda solution and the solution is kept at 25° for 4 hours. After cooling to 0° the pH of the solution is adjusted to 7.5 with 4 N sulphuric acid, the solution is concentrated by evaporation to half its volume, is washed with ethyl acetate, and the aqueous phase is acidified to pH 1 with 4 N sulphuric acid and is extracted with ethyl acetate. This ethyl acetate extract is dried over sodium sulphate, is evaporated to dryness, and the residue is recrystallized from ether. The resulting (2R,5S,10aS,10bS)-2-carboxy-3,6-dioxo-10b-hydroxy-2-isopropyl-5-(propyl-1)-octahydro-8H-oxazolo[3,2-a]pyrrolo[2,1-c]pyrazine has a M.P. of 152°–153° (decomp.), $[\alpha]_D^{20} = +31°$ ($c = 1$ in dimethyl formamide).

c. (2R,5S,10aS,10bS)-2-chloroformyl-3,6-dioxo-10b-hydroxy-2-isopropyl-5-(propyl-1)-octahydro-8H-oxazolo[3,2-a]-pyrrolo[2,1-c]pyrazine.

27 g (130 millimols) of phosphorus pentachloride are suspended in a mixture of 320 cc of anhydrous diethyl ether and 320 cc of petroleum ether, the suspension is stirred at 25° for 60 minutes, is cooled to 10°, 34 g (100 millimols) of (2R,5S,10aS,10bS)-2-carboxy-3,6-dioxo-10b-hydroxy-2-isopropyl-5-(propyl-1)-octahydro-8H-oxazolo[3,2-a]pyrrolo[2,1-c]pyrazine are added and the suspension is stirred at 25° for 4 hours. After filtration the crystalline mass is washed with ether/petroleum ether (1:1) and dried in a vacuum in the absence of moisture. (2R,5S,10aS,10bS)-2-chloroformyl-3,6-dioxo-10b-hydroxy-2-isopropyl-5-(propyl-1)-octahydro-8H-oxazolo[3,2-a]pyrrolo[2,1-c]pyrazine, having a M.P. of 115°–117° (decomp.), $[\alpha]_D^{20} = +33°$ in methylene chloride, is obtained. This compound is unstable and is used as rapidly as possible for the following stage of the synthesis.

When phosphorus pentabromide is used as halogenating agent the corresponding (2R,5S,10aS,10bS)-2-bromoformyl-3,6-dioxo-10b-hydroxy-2-isopropyl-5-(propyl-1)-octahydro-8H-oxazolo[3,2-a]-pyrrolo[2,1-c]pyrazine is obtained.

d. (2R,5S,10aS,10bS)-2-benzyloxycarbonylamino-3,6-dioxo-10b-hydroxy-2-isopropyl-5-(propyl-1)-octahydro-8H-oxazolo[3,2-a]pyrrolo-[2,1-c]pyrazine.

23.5 g (67 millimols) of (2R,5S,10aS,10bS)-2-chloroformyl-3,6-dioxo-10b-hydroxy-2-isopropyl-5-(propyl-1)-octahydro-8H-oxazolo[3,2-a]pyrrolo[2,1-c]pyrazine are gradually added at −5° while stirring vigorously to a mixture of 250 cc of methylene chloride, 34 cc of water and 11.3 g (173 millimols) of sodium azide, and the mixture is stirred for a further 6 minutes. After separating the phases the aqueous phase is extracted with 100 cc of methylene chloride, the combined organic phases are washed with N sodium hydrogen carbonate solution, are dried over sodium sulphate and evaporated to dryness. The residue is dissolved in 130 cc of water- and alcohol-free chloroform, 10.3 g (96 millimols) of benzyl alcohol are added, the mixture is heated at reflux for 90 minutes, is concentrated by evaporation, and the crystalline residue is crystallized from diethyl ether. (2R,5S,10aS,10bS)-2-benzyloxycarbonylamino-3,6-dioxo-10b-hydroxy-2-isopropyl-5-(propyl-1)-octahydro-8H-oxazolo[3,2-a]-pyrrolo[2,1-c]pyrazine, having a M.P. of 205°–207°, $[\alpha]_D^{20} = +39°$ ($c = 1$ in pyridine), is thus obtained.

e. (2R,5S,10aS,10bS)-2-amino-3,6-dioxo-10b-hydroxy-2-isopropyl-5-(propyl-1)-octahydro-8H-oxazolo[3,2-a]pyrrolo[2,1-c[pyazine hydrochloride.

49.5g (111 millimols) of (2R,5S,10aS,10bS)-2-benzyloxycarbonylamino-3,6-dioxo-10b-hydroxy-2-isopropyl-5-(propyl-1)-octahydro-8H-oxazolo[3,2-a]pyrrolo[2,1-c]pyrazine are dissolved in a mixture of 200 cc of dimethyl formamide and 500 cc of dioxane, 34 cc of a 4 N hydrochloric acid solution in dioxane and 12 g of 10 percent palladium on charcoal are added, and hydrogenation is effected at normal pressure and room temperature. After the taking up of hydrogen is complete, filtration is effected, the catalyst is washed with methylene chloride, and the filtrate is dried. After crystallizing the residue from 100 cc of tetrahydrofuran (2R,5S,10aS,10bS)-2-amino-3,6-dioxo-10b-hydroxy-2-isopropyl-5-(propyl-1)-octabrydro-8H-oxazolo[3,2-a]pyrrolo[2,1-c]-pyrazine hydrochloride, having a M.P. of 142° (decomp.), $[\alpha]_D^{20} = +29°$ ($c = 2$ in trifluoroacetic acid), is obtained.

The d-2-benzyloxy-2-isopropyl-malonic acid chloride monoethyl ester, used as starting material in stage (b), may be produced as follows:

a'. 2-Benzyloxy-2-isopropyl-malonic acid diethyl ester.

133 g (0.5 mols) of 2-benzyloxy-malonic acid diethyl ester and 110 g (0.6 mols) of diisopropyl sulphate are mixed, and a sodium alcoholate solution prepared from 15 g of sodium and 300 cc of absolute ethanol is added dropwise within 90 minutes while stirring and slightly cooling (to about 35°–45°). The reaction mixture is subsequently stirred at 45° for 2 hours and then at 60° for 1 hour. The reaction mixture is cooled to room temperature, is made neutral with glacial acetic acid, and 1.5 liters of water are added. Working up is effected by extracting several times with ether, washing the combined ethereal phases with a dilute aqueous sodium carbonate solution and subsequently with water. The ethereal extracts are dried over sodium sulphate and the solvent is removed by evaporation. The remaining yellow oil is distilled at 0.1 mm of Hg and a bath temperature of 200° for purposes of purification.

b'. 2-Benzyloxy-2-isopropyl-malonic acid monoethyl ester.

924 g (3.0 millimols) of 2-benzyloxy-2-isopropyl-malonic acid diethyl ester are dissolved in 2400 cc of ethanol, 4,400 cc (6.15 millimols) of a 1.40 N solution of potassium hydroxide in ethanol are added while stirring, and the reaction mixture is stirred at 25° for 16 hours. After the addition of 3,000 g of ice the pH of the reaction mixture is adjusted to 8.0 with about 120 cc of concentrated phosphoric acid, and the ethanol is removed in a vacuum at 30°–40°. After the addition of 3,000 cc of distilled water the pH of the reaction mixture is adjusted to 8 to 9 with about 180 cc of 4 N caustic soda solution. The resulting light yellow solution is extracted thrice with 1,000 cc amounts of ether, whereby the ethereal extract is counterextracted each time with 60 cc amounts of a 10 percent sodium bicarbonate solution, and the combined sodium bicarbonate extracts are added to the aqueous solution. The alkaline, aqueous solution is cooled to −5°, is covered with a layer of 3,000 cc of ether and is then slowly acidified to pH 2 with about 840 cc of concentrated phosphoric acid while stirring vigorously. The two phases are separated and the aqueous phase is again extracted twice with 600 cc amounts of ether. The combined ether solutions are washed with 600 cc amounts of water (4 to 5 times) until the wash water has a pH value of 4, whereby the wash water is extracted back each time with 100 cc of ether. The combined ethereal solutions are washed twice with 600 cc amounts of a 30 percent sodium chloride solution, are dried over sodium sulphate, filtered off, concentrated and dried in a high vacuum until a constant weight is obtained. A viscous, slightly yellowish oil is obtained, which is homogeneous in accordance with the thin layer chromatogram (silica gel), eluant: methanol and chloroform/methanol (7:3). $n_D^{20}$= 1.4988.

c'. R(+)-2-benzyloxy-2-isopropyl-malonic acid monoethyl ester.

1,460 g (8.83 mols) of l-pseudoephedrine dried at 50° in a high vacuum for 16 hours are added to a solution of 2,330 g (8.32 mols) of racemic 2-benzyloxy-2-isopropyl-malonic acid monoethyl ester in 15 liters of ether over sodium wire while stirring vigorously and in the absence of moisture, seeding is effected with 1 g of the diastereoisomer formed from l-pseudoephedrine and S(−)-2-benzyloxy-2-isopropyl-malonic acid monoethyl ester, and the mixture is allowed to stand at 0° for 2 days. A crystalline crust is formed, which is decanted and washed with 1,000 cc of anhydrous ether. 3,000 g of ice are added to the ethereal solution, and the solution is carefully acidified with concentrated phosphoric acid while stirring vigorously. After separating the phases the aqueous phase is again extracted thrice with 1,000 cc amounts of ether. The combined ethereal phases are then washed five times with 2,000 cc amounts of water, and the wash water is extracted each time with 500 cc amounts of ether, which are added to the combined ether phase. The pH of the last wash water should amount to about 4. After washing the ethereal phase with 2,000 cc of a 30 percent common salt solution drying is effected over sodium sulphate, and the solution is dried. A viscous oily residue is obtained, which is dried at 30° in a high vacuum for 16 hours on a rotary evaporator with slow rotation, until a constant weight is obtained. The resulting oil, enriched with R(+)-2-benzyloxy-2-isopropyl-malonic acid monoethyl ester, is dissolved in 12 liters of ether over sodium wire, and 1,127 g (6.81 mols) of d-pseudoephedrine, dried in a high vacuum at 50° for 16 hours, are added while stirring vigorously. After dissolution (2 to 3 minutes) and seeding with the diastereoisomer formed from d-pseudoephedrine and R(+)-2-benzyloxy-2-isopropyl-malonic acid ethyl ester the solution is allowed to stand at 0° for 2 days. The crystalline crust is decanted and the crystalline mass is washed 5 times with 1,000 cc amounts of anhydrous ether. The resulting diastereoisomer formed from R(+)-2-benzyloxy-2-isopropyl-malonic acid monoethyl ester and d-pseudoephedrine is suspended in 5,000 cc of ether, 3,000 g of ice and 685 cc of concentrated phosphoric acid are added with stirring, the phases are separated, the aqueous phase is extracted thrice with 1,000 cc amounts of ether, and the combined ethereal solutions are washed 5 times with 1,000 cc amounts of water, and are counterwashed each time with 300 cc amounts of ether. The pH of the last wash water should amount to 4. The combined ethereal solutions are washed with 1,000 cc of a 30 percent common salt solution, are dried over sodium sulphate, evaporated to dryness and dried in a high vacuum on a rotary evaporator with slow rotation. The residue is homogeneous in accordance with the thin layer chromatogram on silica gel in chloroform/methanol (7:3) (development with potassium permanganate). $[\alpha]_D^{20}$= +8.2° ($c$ = 5.0 in ethanol).

d'. S(+)-2-benzyloxy-2-isopropyl-malonic acid chloride monoethyl ester.

981 g (3.5 millimols) of R(+)-2-benzyloxy-2-isopropyl-malonic acid monoethyl ester are dissolved in 1,500 cc of methylene chloride, the solution is cooled to −20°, a solution of 560 cc (3.85 millimols) of dimethyl formamide in 530 cc of methylene chloride is added, and a solution of 328 cc (4.55 millimols) of thionyl chloride in 328 cc of methylene chloride is subsequently added dropwise while stirring vigorously, the cooling bath is removed and the reaction mixture is stirred at 25° for a further 16 hours. The methylene chloride is removed by evaporation in a vacuum at 30° and the bath temperature is subsequently raised from 30° to 70°. As soon as distillation stops, this is continued in a high vacuum at a bath temperature of 70° for a further 3 hours, whereby a white byproduct which reacts violently with water, sublimates. A heterogeneous, dark brown mixture is obtained, which is kept over night at −15°. A dark crystalline mass separates. The liquid is decanted in the absence of moisture and is distilled twice without fractionation at a bath temperature of 140° in a high vacuum and in the absence of moisture, whereby each distillation should not exceed 3 hours (distillation temperature 120°/0.3 mm of Hg and 105°/0.05 mm of Hg). A light yellowish liquid is thus obtained. $n_D^{20}$= 1.5008, $[\alpha]_D^{20}$= +51.3° ($c$ = 5.0 in benzene).

What is claimed is:
1. Ergonorcornine.
2. 1-Methyl-ergonorcornine.

* * * * *

Disclaimer 3,681,355.—*Stephan Guttmann*, Allschwil, and *Rene Huhuenin*, Reinach Basel-Land, both of Switzerland. ERGONARCARNINES. Patent dated Aug. 1, 1972. Disclaimer filed May 22, 1972, by the assignee, *Sandoz Ltd.* (also known as Sandoz A.G.)

Hereby disclaims the portion of the term of the patent subsequent to May 30, 1989.

[*Official Gazette September 11, 1973.*]